United States Patent [19]

Cagnato

[11] 4,097,970

[45] Jul. 4, 1978

[54] SAFETY FASTENER

[76] Inventor: Ennio Cagnato, Rue Neuve du Molard 18, CH-1204 Geneva, Switzerland

[21] Appl. No.: 814,695

[22] Filed: Jul. 11, 1977

[51] Int. Cl.² .................................................. A44B 13/00
[52] U.S. Cl. ............................................................ 24/238
[58] Field of Search .................................... 24/238, 239

[56] References Cited

U.S. PATENT DOCUMENTS

| 508,910 | 11/1893 | Bickle | 24/238 |
|---|---|---|---|
| 1,370,711 | 3/1921 | Sonnenthal | 24/238 |
| 2,826,798 | 3/1958 | Kahl | 24/238 |
| 3,984,900 | 10/1976 | Cirelli | 24/238 |

FOREIGN PATENT DOCUMENTS

| 515,956 | 12/1952 | Belgium | 24/239 |
|---|---|---|---|
| 32,883 | 2/1924 | Denmark | 24/238 |
| 96,032 | 9/1922 | Switzerland | 24/239 |

*Primary Examiner*—Bernard A. Gelak
*Attorney, Agent, or Firm*—Saul Jecies

[57] ABSTRACT

A safety fastener for jewelry, sports articles, leashes or the like has a casing provided with two side walls having registering openings. A locking member is slidable lengthwise between these side walls and has another opening. When all openings are in registry an article to be connected to the fastener can be inserted into the openings; when thereafter the locking member is shifted relative to the side walls of the casing, the opening of the locking member moves out of registry with the openings of the side walls and the article is locked.

9 Claims, 10 Drawing Figures

SAFETY FASTENER

BACKGROUND OF THE INVENTION

The present invention relates to fasteners, and more especially to safety fasteners for use with items of jewelry, leashes, sports articles or the like.

The safety fastener according to the invention will hereafter be described with reference to its application as a fastener for jewelry items, such as necklaces, bracelets or the like. However, it should be understood that, depending upon its dimensions and/or materials, the fastener can also be used for other purposes mentioned above, as well as for still further purposes which are within the general ambit outlined by those mentioned above.

Fasteners used for jewelry articles (usually clasps of one kind or another) have the disadvantage of being less than safe, insofar as their security against coming apart unintendedly is concerned. As a result it is customary, at least in the case of valuable jewelry, to provide an additional short chain which connects the ends of the necklace, bracelet or the like together so as to act as a safety device against unintended separation of the fastener. This, of course, makes it more complicated to put the jewelry piece in place and to remove it again.

In part, at least, these problems can be traced to the size of such fasteners. Jewelry pieces require small fasteners; such small fasteners can be used only with small safety springs and these, unfortunately, often cause the fastener to malfunction because they are too weak. Larger fasteners, having a more solid construction, are generally such that miniaturization for another use (e.g. for use with jewelry) is impossible.

SUMMARY OF THE INVENTION

It is, therefore, an object of this invention to provide a fastener which avoids the disadvantages of the prior art.

Another object is to provide a fastener of the kind mentioned herein, which is reliable in operation and is suitable, depending upon its size and/or material, not only for use with items of jewelry but also for many other uses which are totally unconnected with jewelry.

In keeping with these objects, and with still other ones which will become apparent as the description proceeds, one aspect of the invention resides in a safety fastener having a casing provided with two transversely spaced side walls having respective registering openings. A locking member is slidable intermediate the side walls between one position in which it unblocks the openings and permits the insertion thereinto of an article to be connected with the fastener, and another position in which it blocks the openings and prevents withdrawal of the article from the openings.

Exemplary embodiments of the fastener according to the invention will be described below in connection with the accompanying drawing. However, it should be understood that the invention is not limited to these embodiments and is expresssed only in the appended claims.

DESCRIPTION OF PREFERRED EMBODIMENTS

Figure 1:
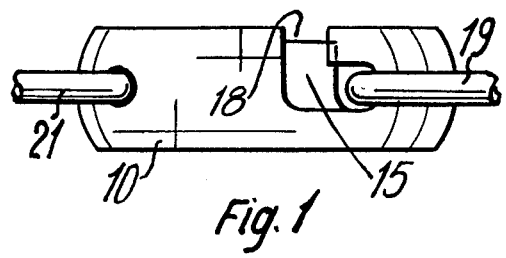
FIG. 1 is a side elevation of a fastening according to an embodiment of the invention.
Figure 4:
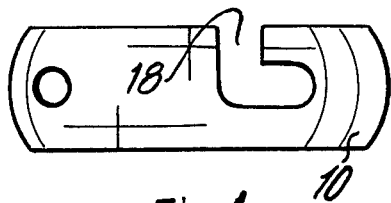
FIG. 4 is a side elevation of the casing alone.

One embodiment of the invention is described and illustrated in FIGS. 1 to 6. It comprises a casing 10 which is hollow and has two transversely spaced side walls 12, 13. Each of these side walls 12, 13 is formed with an opening (here in form of a notch in one of its free edges); these openings have reference numeral 18 and the two openings in the two side walls 12, 13 are in registry with each other. One end of the casing 10 tapers to a wedge shape where the two side walls 12, 13 are brought together and joined, e.g. by welding or by a resilient connection, to form a neck 14. In fact, the ends of the side walls need not actually be connected; if the walls are sufficiently strong the ends could simply be located closely adjacent one another but not be physically connected.

A locking member is received between the side walls 12, 13 and can slide lengthwise in the casing 10. It is also provided with an opening 16, in form of a notch, and this opening can be made to register with the openings 18 when the locking member 15 is in one position, or to move out of such registry when the locking member is placed into another position. The forward end of the locking member 15 is formed with a taper 17 which is so dimensioned that when the locking member is displaced towards the right in FIGS. 1 and 2, the taper will become wedged into the neck 14.

Figure 2:
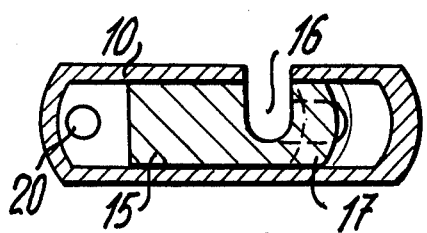
FIG. 2 is a vertical longitudinal section through the fastener of FIG. 1.
Figure 5:
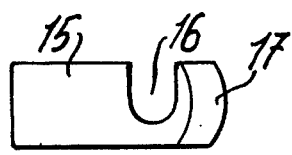
FIG. 5 is a side elevation of the locking member alone.
Figure 3:
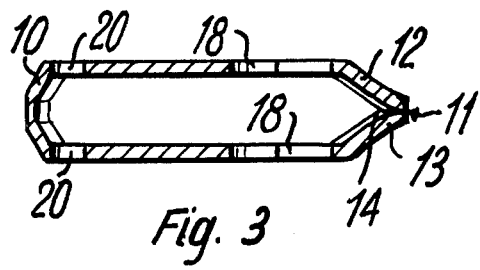
FIG. 3 is a horizontal longitudinal section through only the casing of the fastener in FIGS. 1 and 2, other parts being omitted for clarity.
Figure 6:
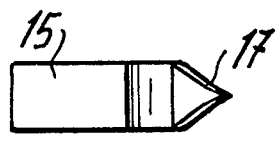
FIG. 6 is a horizontal longitudinal section through the locking member in FIG. 5.
Figure 7:
FIGS. 7 to 10 are respective cross-sections through differently shaped casings usable in connection with the fastener of the present invention.
Figure 8:
Figure 9:
Figure 10:

When the locking member 15 is in the position shown in FIG. 2, a ring, chain link or other element 19 to be connected to the fastener can be inserted into the registering openings 16, 18, 18. When the element 19 is then pulled lengthwise of the fastener, i.e. to the right in FIG. 2, it displaces the locking member 15 to the rights within the casing 10, towards the neck 14, since the portion of element 19 which is located in opening 16 exerts pull upon the locking member 15. When the pull is sufficiently strong, the taper 17 is pulled into and wedged in the neck 14, where it is frictionally retained without the aid of springs, making it impossible for the fastener to open up unintentionally. This is, of course, a very simple and efficient way of operating the fastener. To release the fastener the element 19 and the casing 10 are displaced in the opposite sense, i.e. a force is exerted upon the locking member 15 in the opposite direction than before.

The casing 10 may have one or more (e.g. two) holes 20 for engagement with a connecting member 21, for example an end link of a necklace, a bracelet or the like.

The casing 10 may be of any desired circular or polygonal cross-section. Thus FIGS. 7 to 10 show by way of example that it may be of rectangular, circular, oval or quadratic cross-section, to name just a few possibilities. Sections from which the casing 10 can be made (e.g. with the addition of the openings 18) are already commercially available on the market in various precious metal (e.g. gold, silver) or base metals (e.g. steel). Thus, the fastener according to the invention can be produced inexpensively by making use of such commercially available elements.

The inventive fastener can, of course, be made of any desired material and of any desired size. It can be used for non-jewelry applications, for example leads for toddlers or for animals, for belts, for sporting equipment (e.g. in sailing applications for tackle), and for still other uses. Owing to its very simple structure and the very small number of parts involved, the fastener according to the invention is not only inexpensive to produce, but virtually free of malfunction and extremely simple to operate.

The invention has been described above with respect to specific examples. However, these are for illustration and explanation only and persons of ordinary skill in the art will perceive various modifications which are all within the ambit of the invention and intended to be encompassed by the appended claims.

I claim:

1. A safety fastener, comprising
a casing having two opposite ends and a pair of transversely spaced discrete side walls each including a first portion extending from one of said ends towards the other end and a second portion extending from said first portion to said other end, said first portions extending parallel to each other and being provided with registering openings and said second portions converging in direction towards each other and towards said other end; and
a locking member received in said casing and having an end portion of wedge-shaped configuration, said locking member being slidable in said casing between a first position in which said openings are unobstructed so that an element to be connected to the fastener can be placed into the openings, and a second position in which said wedge-shaped end portion is wedged into the tapering spaced between said converging second portions and said locking member blocks said openings against withdrawal of said element from the same.

2. A safety fastener as defined in claim 1, wherein said locking member also has an opening which is respectively in and out of register with the openings of said side walls when said locking member is in said first and second positions thereof.

3. A safety fastener as defined in claim 1; and further comprising means on said casing for securing the same to a connecting member.

4. A safety fastener as defined in claim 3, wherein said means comprises at least one hole formed in said casing.

5. A safety fastener as defined in claim 1, wherein said closure is for a piece of jewelry and at least said casing is of a precious metal.

6. A safety fastener as defined in claim 1, wherein said casing has a square cross-section.

7. A safety fastener as defined in claim 1, wherein said casing has a rectangular cross-section.

8. A safety fastener as defined in claim 1, wherein said casing has a circular cross-section.

9. A safety fastener as defined in claim 1, wherein said casing has an oval cross-section.

* * * * *